United States Patent Office 3,011,342
Patented Dec. 5, 1961

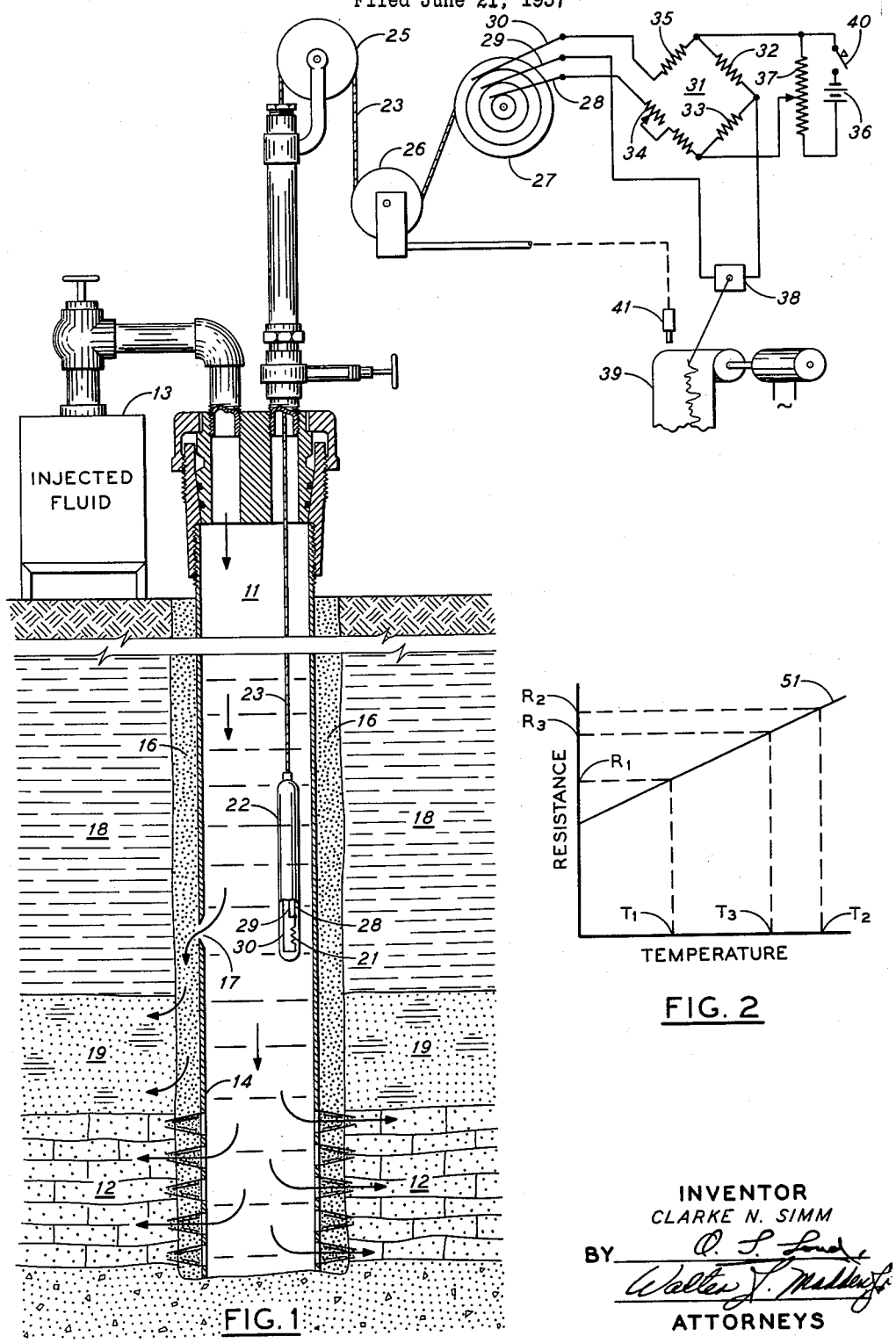

3,011,342
METHODS FOR DETECTING FLUID FLOW IN A WELL BORE
Clarke N. Simm, Fullerton, Calif., assignor to California Research Corporation, San Francisco, Calif., a corporation of Delaware
Filed June 21, 1957, Ser. No. 667,244
3 Claims. (Cl. 73—155)

This invention relates in general to well surveying, and relates more particularly to methods for determining the location and/or velocity of fluid flow into or out of a subterranean well bore.

There are numerous applications where it is desired or required to obtain information concerning the flow of fluid into or out of a subterranean well bore. One of such applications is in connection with the injection into a well bore of a fluid used in secondary recovery of oil from the formation penetrated by the well bore. In this application, a suitable fluid, such as water or gas, is injected into the formation through the well bore to increase the pressure in the oil-bearing formation to thus drive the oil toward an adjacent recovery well or wells. In such an application it is desirable from an economic standpoint that substantially all of the injected fluid go to the formation being treated and that as little as possible be diverted from the desired formation or formations.

One factor which sometimes causes such diversion is the presence of one or more leaks in the casing which lines the injection well bore. Such a casing is perforated in the interval spanning the formation to be treated, but leaks in other portions of the casing may cause a serious loss of injected fluid. The detection and location of such leaks is a very difficult problem, and numerous methods and apparatus have been proposed for its solution. However, all of such prior art methods and apparatus have been either too cumbersome, expensive and time-consuming to justify their use on any appreciable scale, or they have been so inaccurate that the results obtained thereby did not warrant their use. The most common type of prior art technique is the spinner survey in which the revolutions of an impeller in the well fluid are correlated with the velocity of the fluid. However, owing to the variable bearing friction in the rotating impeller, the accuracy and sensitivity of the technique are very poor.

The present invention contemplates methods for determining the location and velocity of fluid movement through such leaks by means of the cooling effect produced by such leaks on a temperature-sensitive electrical resistance element. In accordance with this invention, an electrical resistance element whose resistance varies as a predeterminable function of temperature is immersed in the well bore in the injected fluid, and variations in the resistance of the resistance element under predetermined conditions are noted. In the preferred form of the invention, the resistance element is in the form of a platinum resistance element whose resistance varies linearly as a function of temperature. This resistance element is electrically connected to a suitable measuring network and is immersed in the injected fluid in the well bore.

A predetermined first value of electrical current is supplied to the resistance element and its resistance is allowed to stabilize at the temperature prevailing at its location in the well bore. After such stabilization, the current is changed to a second value different from the first value, and the change in resistance of the resistance element is noted. If there is no fluid leakage in the vicinity of the resistance element, the resistance of the element will vary linearly in response to the variation in current supplied thereto, in accordance with the linear relationship between temperature and resistance which obtains for the element.

However, if there is fluid leakage from the well bore in the vicinity of the resistance element, the cooling action on the resistance element produced by this leakage will cause the temperature variation of the resistance element in response to the variation in current therethrough to be different than it would be if no such cooling action occurred. Thus, the resistance change in the resistance element is different from the change which should obtain in the absence of the fluid leak, and this change in resistance is detected by the measuring network to which the resistance element is connected. The depth of the resistance element in the well bore where this variation occurs indicates the location of the leak. This nonlinear resistance change may be converted to velocity of fluid flow by taking into account the magnitude of the resistance variation involved, in correlation with the velocity of injection of the fluid.

It is therefore an object of the present invention to provide improved methods for determining the location of fluid flow out of a well bore penetrating a subterranean formation.

It is an additional object of the present invention to provide methods for determining the location of leaks of fluid out of a well bore by measuring the cooling effect of such leaks on an electrical resistance element whose resistance varies as a predeterminable function of temperature.

It is a further object of this invention to provide methods for determining the location and velocity of fluid leaks in a well bore in which variations in the resistance of a resistance element whose resistance varies as a linear function of temperature are measured as an indication of the cooling action of such leaks on said element.

Objects and advantages other than those set forth above will be apparent from the following detailed description when read in connection with the accompanying drawing, in which:

FIG. 1 diagrammatically illustrates apparatus for carrying out the present invention disposed in a representative well bore; and FIG. 2 is a graph illustrating the temperature-resistance characteristic of the temperature-sensitive resistance element and its relation to the operation of the present invention.

Referring to the drawing by character of reference, numeral 11 designates a well bore through which a fluid is injected to a subterranean formation 12. Formation 12 may be an oil-bearing sand into which the fluid is injected for secondary recovery operations. The fluid may be water, in the case of a water-flooding operation, or may be a hydrocarbon, in the case of solvent flooding for a miscible displacement-type secondary recovery operation, or any other injected fluid. The fluid is pumped from a suitable source 13, such as a compressor, or pump, through a well head fitting into the well bore. Well bore 11 is lined with a casing string 14 which is cemented in position by cementing material 16. Casing 14 is perforated in the interval across formation 12 to permit the injected fluid to flow into this formation.

Casing 14 also has a leak 17 therein in the portion adjacent a formation 18, and a portion of the injected fluid from source 13 flows out of the well bore through this leak and thence through channels in cement 16 to a formation 19. This leaking portion of the injected fluid is effectively wasted, since little or none of it reaches formation 12, and it is desirable that the location of the leak be determined so that remedial measures may be taken to plug it.

To detect the leak in accordance with the present invention, a temperature-sensitive device is lowered into the well bore in the approximate vicinity of the leak. In the preferred form of the invention, the temperature-sensitive device is in the form of a platinum resistance element 21. Platinum resistance element 21 has a linear temperature-resistance characteristic, at least over the temperature range in which it is to be operated in the well bore, so that a variation in the temperature of the element will produce a corresponding, predictable variation in the resistance of the element. Element 21 may be mounted in the lower end of a sinker bar 22 which is suspended in the well bore by a cable 23. Element 21 is so mounted in the lower end of sinker bar 22 as to be exposed to and responsive to the temperature of the fluid in the well bore while being protected from mechanical damage, particularly while being run in and out of the well bore.

Cable 23 passes through an opening in the well head fitting and passes over a pair of sheaves 25 and 26 to a winch drum 27. Winch 27 is provided with a suitable commutating arrangement for conveying the electrical signal transmitted through cable 23 to the appropriate surface circuit. Resistor 21 has three conductors 28, 29 and 30 connected thereto as shown, and these conductors extend through cable 23 to the surface recording equipment. Such equipment includes a bridge circuit 31 having two arms formed by resistors 32 and 33, a third arm formed by a padding resistor 34, cable conductor 28 and resistor 21; and a fourth arm formed by a resistor 35 and cable conductor 30. Power is supplied to bridge 31 from a battery 36 through a switch 40 which connects battery 36 to a voltage divider 37.

The connection of conductors 28, 29 and 30 to bridge 31 in the manner shown provides compensation for variations in the resistance of these conductors as their temperature varies with variations in the length of cable 23 in the well bore, since, as will be noted, conductors 28 and 30 are effectively connected to adjacent arms of bridge 31, so that their resistance variations neutralize each other. The illustrated three conductor connection is preferably utilized for maximum accuracy, but it will be apparent that, if desired, resistor 21 may be connected to the bridge by only two conductors.

As will be readily understood, resistance element 21 is in one arm of bridge 31, so that variations in the resistance of this element produce corresponding variations in the output of the bridge. This output signal is supplied to the recording element 38 of a recorder which drives a pen over a chart 39. Chart 39 also is provided with a depth marking device 41 which may be associated with sheave 26 and which provides on chart 39 an indication of the depth of the sonde in the well bore.

The operation of the embodiment illustrated in FIG. 1 is as follows. Prior to running the survey, the instrument is calibrated so that the resistance of resistor 21 is known for all values of temperature in the temperature range to be used. The sonde comprising resistance element 21 and sinker bar 22 is run into well bore 11 on cable 23 to the approximate vicinity in which the leak is believed to be occurring. Fluid may be injected during the operation of the surveying equipment. When the sonde is located at the desired position, switch 40 is closed to supply power to bridge 31. This supply of power causes a first value of current to flow through resistance element 21 which produces a predetermined heating of element 21. This heating, together with the temperature of the well bore at the location of element 21, causes element 21 to have a given value of resistance, which value may be determined by means of bridge 31 and recorder 38.

After element 21 has been positioned at the predetermined location for a sufficient length of time to permit stabilization of the element temperature, the current through element 21 is changed to a second value by adjustment of divider 37. This change in current through element 21 produces a corresponding change in the temperature of the element, and in the absence of fluid flow out of the casing, this temperature change should produce a predeterminable linear change in the resistance of element 21. However, if element 21 is positioned near leak 17, as it is assumed to be in this case, the flow of fluid through leak 17 will produce a cooling effect on element 21 which will cause the actual resistance change to be different from the expected change by an amount which is a measure of the velocity of the flow through leak 17. Thus, bridge 31 and the recorder will produce on chart 39 an indication of this temperature variation, and the location of the leak may thus be determined.

The graph of FIG. 2 illustrates the operation of element 21 in determining the location and velocity of the fluid leak. In FIG. 2, line 51 represents the linear temperature-resistance relationship which obtains for element 21. Assume that element 21 is positioned in the well bore with a first value of current flowing through it, and that its temperature has stabilized at temperature T1, to produce a corresponding resistance of element 21 of R1. Then, when the current is increased to a second predetermined value, if there is no fluid leak in the vicinity of element 21, the temperature of the element should increase as a result of the increased current flow to a value T2, to produce a corresponding resistance R2. However, if there is a leak in the vicinity of element 21, the cooling action of this leak will cause the temperature of the element to increase to a temperature T3 which is less than temperature T2. Temperature T3 corresponds to a resistance R3 which is different from resistance R2, so that the output of bridge circuit 31 is different than it would be if no fluid leak occurred. By suitably calibrating bridge 31, the output signal therefrom may be made a direct measure of amount by which resistance R3 differs from resistance R2 and hence this output signal will be a measure of the velocity of the fluid leak. By correlating this output signal as recorded on chart 39 with the depth index supplied thereto by device 41, the location and velocity of the leak may be accurately determined from the chart.

It will be understood that several runs of the logging sonde may be required before the sonde is disposed adjacent the leak, but it will be seen that such runs may be easily made without requiring that the sonde be withdrawn from the hole.

Although but a few embodiments of the present invention have been described, it will be obvious to those skilled in the art that various changes and modifications may be made therein without departing from the spirit of the invention of the scope of the appended claims.

I claim:
1. The method of determining the location of the flow of fluid into or out of a well bore penetrating a subterranean formation comprising the steps of introducing a resistance element into said well bore in contact with said fluid, said resistance element having both a predetermined resistance variation as a function of temperature and a predetermined temperature variation as a function of electrical current flow therethrough, positioning said resistance element at a first depth within said well bore, supplying a first value of electrical current to said resistance element for a period of time sufficient to permit the temperature and therefore the resistance of said resistance element to stabilize at a first resistance value, measuring said first resistance value of said resistance element, changing the current supplied to said resistance element to a second value and supplying said second value of current to said resistance element for a period of time sufficient to permit the temperature and therefore the resistance of said resistance element to stabilize at a second resistance value, measuring said second resistance value of said resistance element, detecting the change in resistance of said resistance element in response to the change of current between said first and said second value of current, comparing said change in resistance to said predetermined resistance variation as a function of electrical current to detect a change in resistance of said resistance element which is different from said predetermined resistance variation as a function of said change in current and indicative of resistance element temperature variation due to the movement of said fluid within said well bore, moving said resistance element to other depths within said well bore and repeating said supplying, changing and comparing steps, and correlating said detected resistance changes with resistance element depth to determine the location of fluid flow within said well bore.

2. The method of determining the location and velocity of the flow of fluid into or out of a well bore penetrating a subterranean formation comprising the steps of introducing a resistance element into said well bore in contact with said fluid, said resistance element having both a predetermined resistance variation as a function of temperature and a predetermined temperature variation as a function of electrical current therethrough, positioning said resistance element at a first depth within said well bore, supplying a first value of electrical current to said resistance element for a period of time sufficient to permit the temperature and therefore the resistance of said resistance element to stabilize at a first resistance value, measuring said first resistance value of said resistance element, changing the current supplied to said resistance element to a second value and supplying said second value of electrical current for a period of time sufficient to permit the temperature and therefore the resistance of said resistance element to stabilize at a second resistance value, detecting the amount of change in resistance of said resistance element in response to the change in current between said first and second value of current, comparing said amount of change in resistance to said predetermined resistance variation as a function of electrical current to detect a change in resistance differing from said predetermined resistance variation as a function of electrical current and indicative of resistance element temperature variation due to the movement of said fluid within said well bore, moving said resistance element to other depths within said well bore and repeating said supplying, changing and comparing steps, correlating said detected resistance changes with resistance element depth to determine the location of fluid flow into or out of said well bore, and correlating the amount of resistance change between said stabilized resistance value and said resistance after changing said current as an indication of velocity of fluid flow within said well bore.

3. The method of determining the location of fluid flow out of a well bore penetrating a subterranean formation comprising the steps of injecting said fluid into said well bore at a constant rate, introducing a resistance element into said well bore in contact with said fluid, said resistance element having both a predetermined resistance variation as a function of temperature and a predetermined temperature variation as a function of electrical current flow therethrough, positioning said resistance element at a first depth within said well bore, supplying a first value of electrical current to said resistance element for a period of time sufficient to permit the temperature and therefore the resistance of said resistance element to stabilize at a first resistance value, measuring said first resistance value of said resistance element, changing the current supplied to said resistance element to a second value and supplying said second value of electrical current to said resistance element for a period of time sufficient to permit the temperature and therefore the resistance of said resistance element to stabilize at a second resistance value, detecting the change in resistance of said resistance element in response to the change in current between said first and second value of current, comparing said change resistance to said predetermined resistance variation as a function of electrical current to detect a change in resistance different from said predetermined resistance variation as a function of electrical current, said different change in current being attributable to the cooling action of fluid flow passing said resistance element, moving said resistance element to other depths within said well bore and repeating said supplying, changing and comparing steps, and correlating said detected resistance changes of said resistance element with depth along said well bore to indicate the location of fluid flow out of said well bore, the movement of said resistance element to a depth below the location of the flow of fluid out of said well bore being indicated by an indication of resistance variation for said resistance element substantially in accordance with said predetermined resistance variation as a function of electrical current.

References Cited in the file of this patent

UNITED STATES PATENTS

| | | |
|---|---|---|
| 2,389,615 | Eder | Nov. 27, 1945 |
| 2,669,872 | Hartweg | Feb. 23, 1954 |

FOREIGN PATENTS

| | | |
|---|---|---|
| 827,274 | France | Jan. 24, 1938 |

OTHER REFERENCES

Publication: "A Hot-Wire Anemometer For Low Wind Speeds" by R. G. Parr, Journal of Scientific Instruments and of Physics in Industry, vol. 24, December 1947.

Publication: "Thermistor Electronic Thermometer" by R. W. Woods, Science, vol. 121, March 4, 1955.